US010466818B2

United States Patent
Robinson (10) Patent No.: US 10,466,818 B2
(45) Date of Patent: Nov. 5, 2019

(54) POINTING ACTION

(71) Applicant: HEWLETT PACKARD ENTERPRISE DEVELOPMENT LP, Houston, TX (US)

(72) Inventor: Ian N. Robinson, Palo Alto, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 0 days.

(21) Appl. No.: 15/579,369

(22) PCT Filed: Jun. 17, 2015

(86) PCT No.: PCT/US2015/036186
§ 371 (c)(1),
(2) Date: Dec. 4, 2017

(87) PCT Pub. No.: WO2016/204743
PCT Pub. Date: Dec. 22, 2016

(65) Prior Publication Data
US 2018/0181214 A1    Jun. 28, 2018

(51) Int. Cl.
*G06F 3/038* (2013.01)
*G06F 3/0484* (2013.01)
(Continued)

(52) U.S. Cl.
CPC .......... *G06F 3/038* (2013.01); *G06F 3/04842* (2013.01); *G06F 3/1423* (2013.01);
(Continued)

(58) Field of Classification Search
CPC .... G06F 3/038; G06F 3/04842; G06F 3/1423; G09G 5/08; G09G 3/003; G09G 2354/00; G09G 2370/022
(Continued)

(56) References Cited

U.S. PATENT DOCUMENTS 8,686,943 B1    4/2014  Rafii
2008/0059578 A1  3/2008  Albertson et al.
(Continued)

FOREIGN PATENT DOCUMENTS

EP    2610714        7/2013
WO   WO-2008014819   2/2008
WO   WO-2013172898  11/2013

OTHER PUBLICATIONS

Jing, P. et al.; "Human-computer Interaction Using Pointing Gesture Based on an Adaptive Virtual Touch Screen"; Aug. 2013; 12 pages.
(Continued)

*Primary Examiner* — Jennifer Mehmood
*Assistant Examiner* — Ngan T Pham Lu (57) ABSTRACT

An example method is provided in according with one implementation of the present disclosure. The method comprises detecting at least one pointing action directed at a display in a multi-user environment, and determining a location of each detected pointing action on the display and a displayed content being pointed to. The method also comprises communicating the location of each pointing action to all displays in the multi-user environment that are displaying the same content, and mapping the location of each pointing action to a local display layout at each of the displays in the multi-user environment that are displaying the same content. The method further comprises generating a unique marker for each pointing action on all displays of the multi-user environment that are displaying the same content, where each unique marker corresponds to the location of each pointing action performed by a different user.

17 Claims, 3 Drawing Sheets (51) Int. Cl.
*G06F 3/14* (2006.01)
*G09G 5/08* (2006.01)
*G09G 3/00* (2006.01)

(52) U.S. Cl.
CPC ............... *G09G 5/08* (2013.01); *G09G 3/003* (2013.01); *G09G 2354/00* (2013.01); *G09G 2370/022* (2013.01)

(58) Field of Classification Search
USPC ........................................................ 345/157
See application file for complete search history.

(56) References Cited

U.S. PATENT DOCUMENTS

| | | |
|---|---|---|
| 2010/0251169 A1 | 9/2010 | Kimchi et al. |
| 2011/0154266 A1 | 6/2011 | Friend et al. |
| 2012/0227012 A1 | 9/2012 | Davidson |
| 2013/0201104 A1* | 8/2013 | Ptucha .................... G06F 3/017 345/158 |

OTHER PUBLICATIONS

International Searching Authority, International Search Report and Written Opinion dated Mar. 17, 2016 for PCT Application No. PCT/US2015/036186 Filed Jun. 17, 2015, 11 pages.

* cited by examiner

POINTING ACTION

Multi-user communication systems and services may be used to support interactions between a plurality of users or participants that share the same location or are at different locations. Such communication services and systems have been widely used in recent years.

DETAILED DESCRIPTION OF SPECIFIC EXAMPLES

As mentioned above, multi-user communication systems have become increasingly popular in recent years. As used herein, the terms "multi-user system" and "multi-user environment" are to be used interchangeably and refer to an audio-video communication system that includes a plurality of user devices input interfaces (e.g., computers, tablets, etc.), at least one display to display content, and has technical capabilities to identify a user and to present the user on at least one display (e.g., as a name, an image, or a live video capture). For example, mission-control or war-room like systems that are tasked with supporting professional or personal interactions between different users or participants have gained much attention. Due to the fact that people spend most of their time indoors (e.g., office, school, home, etc.), such multi-user communication systems may be useful for many different applications or services. As used herein, the terms "user" and "participant" are to be used interchangeably and refer to a member of a multi-user environment that is currently using the system and is a participating in some type of live communication.

While communicating through such multi-user systems, users many times naturally point to content shown on the display(s) of these systems. Pointing is a very simple and natural way for users to interact with different information shown on the display and shared between the users. Pointing allows users to direct other users' attention to an area of the content. However, in many situations it may be difficult for all users of the multi-user environment to see the area or the object that one of the users is pointing to.

Even when the users share the same location (e.g., same room with one common display), they may be stationed sufficiently far from the display and from each other (e.g., separated by tables, consoles, etc.) such that it is not easy to determine what another person might be pointing at. This may interfere with interactions between users and may slow the overall communication process. This is particularly the case when the multi-user systems displays three-dimensional ("3D") content and each user sees the same 3D image irrespective of their location, so pointing at a location "deep" in the 3D image will necessarily amount to pointing to the wrong place for other participants.

One solution for this problem would be for the user performing the pointing to physically move closer to the display, so their pointing gesture is less ambiguous. However, this may be awkward, the screen may be too big, or may be out of reach. Also, in the case of passive stereo displays, the image may not be viewable close to the display. Another possible approach is to indicate the area of user's interest by using the relevant system's cursor, but that typically requires getting control of that application's cursor. Again, this encumbers an otherwise simple pointing task with significant overhead, plus only one participant can point at any one time. Consequently, a better solution for pointing at content displayed in a multi-user system is desired.

In this regard, according to examples, techniques for generating and displaying unique visual markers related to pointing actions in a multi-user environment/system are described herein. In one example, the proposed techniques present the ability to generate multiple markers based on multiple participants' actions in response to the detection and the recognition of a pointing actions of these participants in a multi-user environment. Specifically, the proposed techniques offer means for potentially multiple users to direct other participants' attentions in a complex multi-display (potentially distributed between different locations) environment via recognizing one or multiple pointing actions (e.g., by depth cameras and body pose recognition techniques or via touchscreen interactions). This results in potentially multiple unique markers being generated at the appropriate location(s) on the displays, each markers possibly accompanied by a name, picture, or live video of the relevant user. As used herein, the terms "markers" and "pointers" are to be used interchangeably and refer to a visual representation of a pointing action by a user that is shown on at least one display of a multi-user system.

In one example, a processor may detect at least one pointing action directed at a display in a multi-user environment and may determine a location of each detected pointing action on the display and a displayed content being pointed to. The processor may further communicate the location of each pointing action to all displays in the multi-user environment that are displaying the same content and may map the location of each pointing action to a local display layout at each of the displays in the multi-user environment that are displaying the same content. Finally, the processor may generate a unique marker for each pointing action on all displays of the multi-user environment that are displaying the same content, where each unique marker corresponds to the location of each pointing action performed by a different user. That way, participants do not have to split their attention between the presenter and the content being focused on: the first is presented on screen adjacent to the second.

Thus, the proposed techniques offer a unique solution for assisted user pointing in multi-user environments. The approach described herein provides a way for one or many users in a multi-user environment to physically point towards content displayed on a display, even when it is physically distant, and have the location at which they are pointing marked on the relevant display so all participants can see exactly where they are pointing. The generated marker(s) may accompanied by a name, image, live video, or audio indicating the person doing the pointing.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Figure 1:
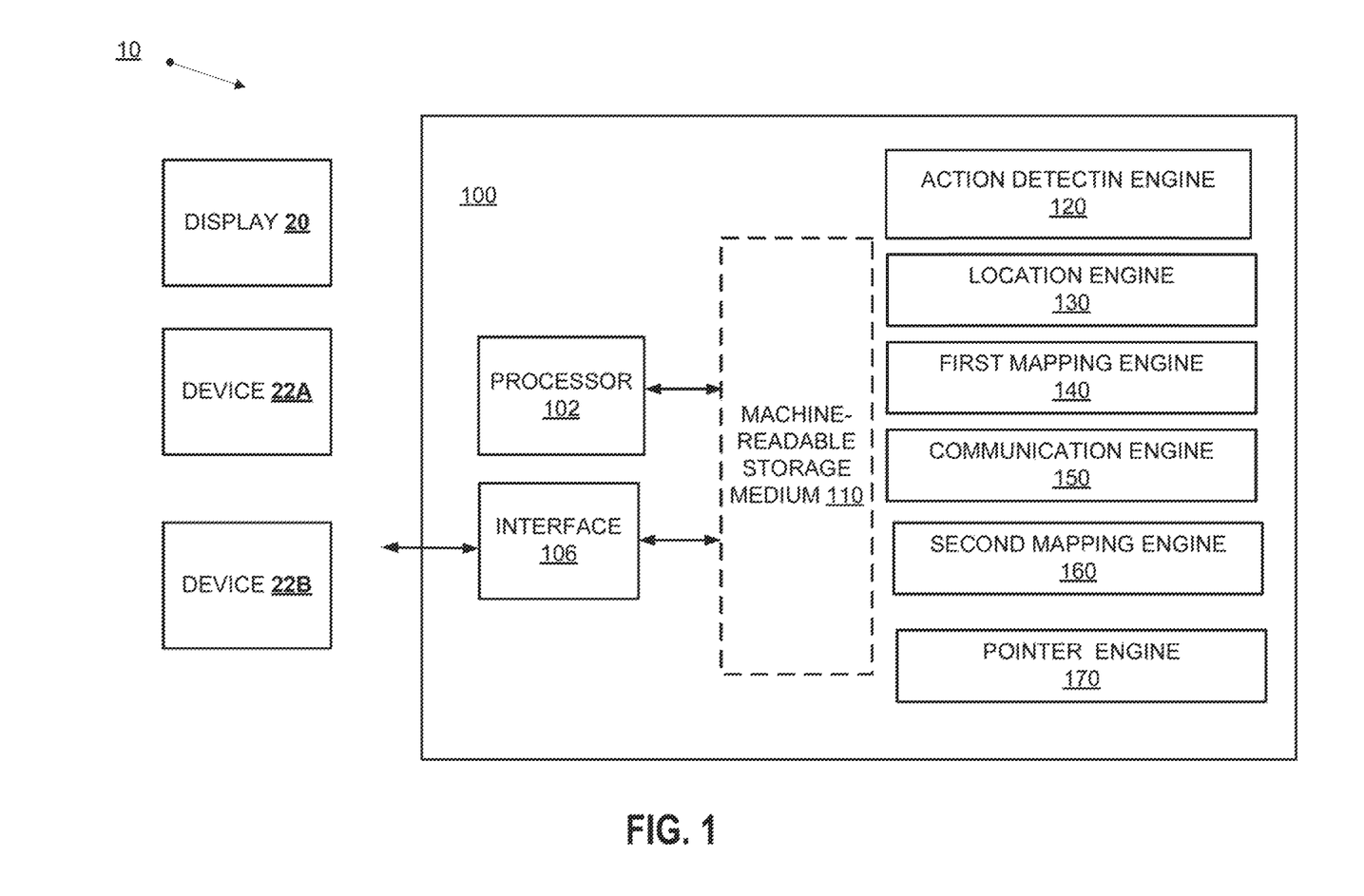
FIG. 1 is a schematic illustration of an example system for generating unique markers related to user pointing actions in a multi-user environment in accordance with an implementation of the present disclosure.

Referring now to the figures, FIG. 1 is a schematic illustration of an example system 10 for generating unique markers related to user pointing actions in a multi-user environment. The illustrated system 10 is capable of carrying out the techniques described below. As shown in FIG. 1, the system 10 is depicted as including at least one a computing device 100. In the embodiment of FIG. 1, computing device 100 includes a processor 102, an interface 106, and a machine-readable storage medium 110. Although only computing device 100 is described in details below, the techniques described herein may be performed with several computing devices or by engines distributed on different devices.

In one example, the computing device 100 for another computing device) may communicate with at least one display 20 (or multiple displays in other implementations) and a plurality of devices 22A-B that are part of a multi-user environment/system and are operated by different users. For examples, a multi-user environment may include an individual display (e.g. in a large conference room), a plurality of wall-size displays positioned at different locations, an immersive virtual reality displays, or any other type or configuration of display(s). Examples of devices 22 include but are not limited to: computers, tablets, smartphones, personal head mounted displays ("HMD"), and any other appropriate devices. In one implementation, the computing device 100 may be one of the devices 22 in the multi-user environment. The number of devices 22 shown in FIG. 1 is intended to be an example and the system 10 may include any number of devices 22.

The computing device 100 may be any type of a computing device and may include at least engines 120-170. In one implementation, the computing device 100 may be an independent computing device. In another implementation, the computing device 100 may be one of the devices in the multi-user environment. Engines 120-170 may or may not be part of the machine-readable storage medium 110. In another alternative example, engines 120-170 may be distributed between the computing device 100 and other computing devices. The computing device 100 may include additional components and some of the components depicted therein may be moved and/or modified without departing from a scope of the system that allows for carrying out the functionality described herein. It is to be understood that the operations described as being performed by the engines 120-170 of the computing device 100 that are related to this description may, in some implementations, be performed by external engines (not shown) or distributed between the engines of the computing device 100 and other electronic/computing devices.

Processor 102 may be central processing unit(s) (CPUs), microprocessor(s), and/or other hardware device(s) suitable for retrieval and execution of instructions (not shown) stored in machine-readable storage medium 110. Processor 102 may fetch, decode, and execute instructions to identify different groups in a dataset. As an alternative or in addition to retrieving and executing instructions, processor 102 may include electronic circuits comprising a number of electronic components for performing the functionality of instructions.

Interface 106 may include a number of electronic components for communicating with various devices. For example, interface 106 may be an Ethernet interface, a Universal Serial Bus (USB) interface, an IEEE 1394 (Firewire) interface, an external Serial Advanced Technology Attachment (eSATA) interface, or any other physical connection interface suitable for communication with the computing device. Alternatively, interface 106 may be a wireless interface, such as a wireless local area network (WLAN) interface or a near-field communication (NFC) interface that is used to connect with other devices/systems and/or to a network. The display 20, the devices 22, and the computing device 100 may be connected via a network. In one example, the network may be a mesh sensor network (not shown). The network may include any suitable type or configuration of network to allow for communication between the computing device 100, display 20, the devices 22, and any other devices/systems (e.g., other computing devices, displays, etc.), for example, to send and receive data to and from a corresponding interface of another device.

Each of the engines 120-170 may include, for example, at least one hardware device including electronic circuitry for implementing the functionality described below, such as control logic and/or memory. In addition or as an alternative, the engines 120-170 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code (e.g., computer executable instructions), hardware, firmware, and/or logic, or combination thereof to perform particular actions, tasks, and functions described in more detail herein in reference to FIGS. 2-3.

In one example, the action detection engine 120 may detect at least one pointing action directed at a display (e.g., display 20) in a multi-user environment. As shown in examples below, the action detection engine 120 may also detect a plurality of pointing actions by different users. Various techniques may be used to detect the pointing actions. Examples of specific techniques are described in more details below. In addition, the action detection engine 120 may further capture information about the user performing each pointing action. For example, the engine 120 may capture at least one of an identification (e.g., name), an image, a video, and an audio of the user performing each pointing action.

The location engine 130 may determine a location of each detected pointing action on the display and the displayed content being pointed to. As explained in additional details below, in some examples, the location engine 130 may use data from various sensors associated with the display 20 or devices 22 (e.g., depth sensors, leap sensors, touch sensors, etc.) to detect the motion of a user. Further, the location engine 130 may use information about the position of the user, the position of the displays, and may perform various calculations to determine the location of each detected pointing action on the display and the displayed content being pointed to.

The first mapping engine 140 may map the location of each pointing action to an application being displayed on the display. In one example, the local arrangement of the display(s) may be mapped to a system reference layout that all locations can reference. In other words, the engine 140 maps from the physical location pointed at (as recognized by different engine 130) and ties that to an actual location in a displayed application (e.g., spreadsheet, graph, etc.), so no matter where that application is displayed in the other display(s) it is still pointing to the same point in that application regardless where the application is positioned in that other display(s).

The communication engine 150 may communicate the location of each pointing action to all displays in the multi-user environment that are displaying the same content (i.e., that participate in the multi-user environment and actually show the content being pointed to). In some examples, the pointing actions that users make relative to their local displays may be broadcasted to other displays (in the same or different physical location) in the multi-user environment by using various signaling protocols. In addition, the engine 150 may also communicate the captured information (e.g., audio, video, etc.) about the user performing each pointing action to all displays multi-user environment that are displaying the same content.

The second mapping engine 160 may map the location of each pointing action to a local display layout at each of the displays in the multi-user environment that are displaying the same content. In other words, when the displays in the multi-user system that are displaying the content being pointed at receive the pointing location, the engine 160 maps the pointing location of the application to the displays at that location. Thus, the pointing location of each pointing action is kept in the same position with respect to the content/application being displayed no matter where it is being displayed.

The pointer engine 170 may generate a pointer for each pointing action on all displays of the multi-user environment that are displaying the same content. In some examples, each pointer corresponds to the location of each pointing action performed by a different user. Thus, a plurality of pointers representing different users performing pointing actions may be generated on the displays of the multi-user environment that are displaying the same content.

In addition, the pointer engine 170 may display at least one of the identification, the image, the video, and the audio of the user performing each pointing action together with each pointer being generated on the displays that are displaying the same content. The pointer engine 170 may also move each of the markers to an area of the displays that is different from the location of each detected pointing action when the corresponding pointing action on the display is no longer detected by the engine 120. Also, the pointer engine 170 may automatically adjust displays in the multi-user environment not displaying the content being pointed to by the at least one pointing action to display the content and the marker for the pointing action. In other words, when some of the displays that are part of the multi-user environment do not display the content being pointed to by the users, engine 170 may adjust these displays to display the content being pointed to.

Figure 2:
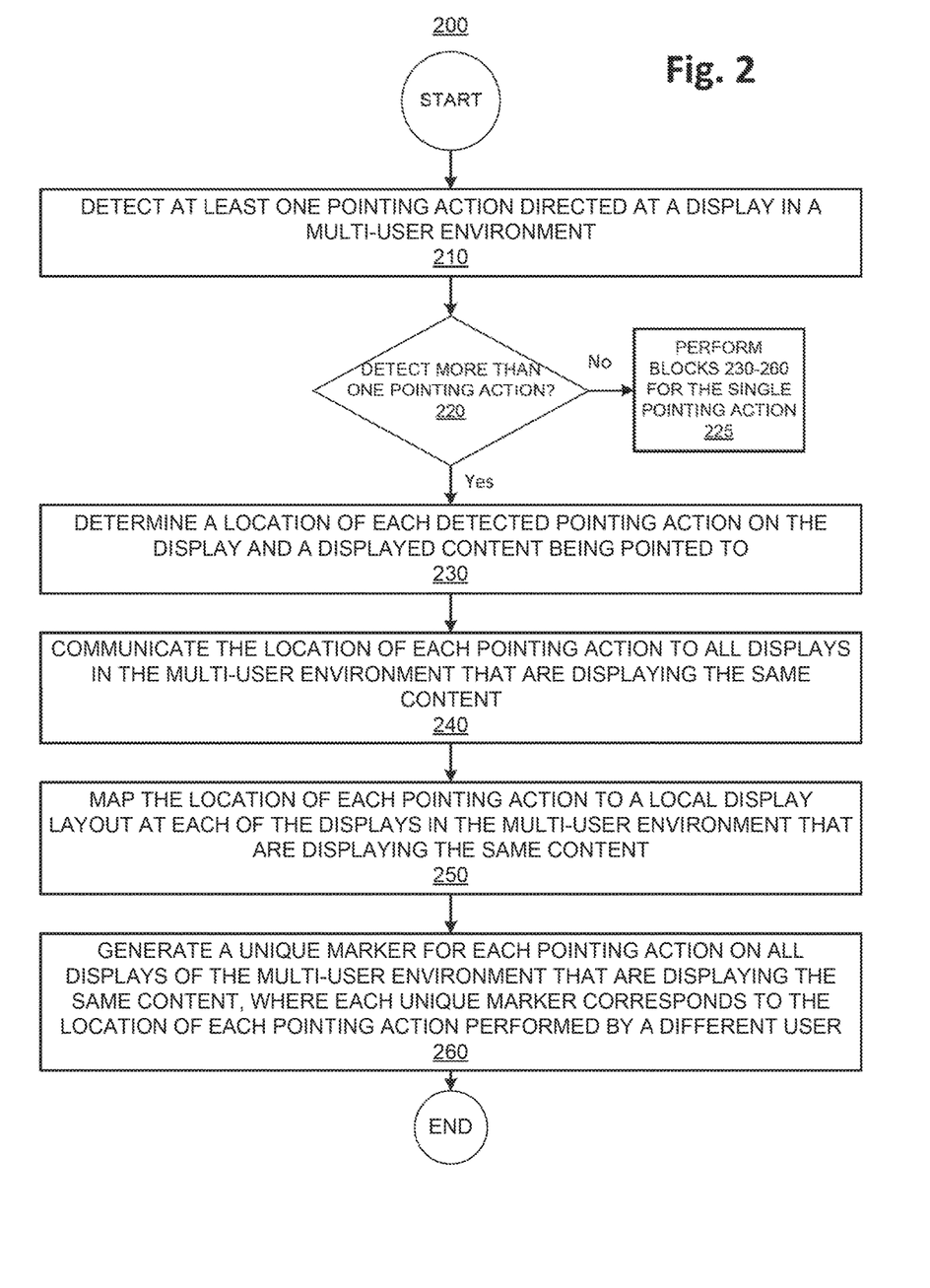
FIG. 2 illustrates a flowchart showing an example of a method for generating unique markers related to user pointing actions in a multi-user environment in accordance with an implementation of the present disclosure.

FIG. 2 illustrates a flowchart showing an example of a method 200 for generating unique markers related to user pointing actions in a multi-user environment. Although execution of the method 200 is described below with reference to the system 10, the components for executing the method 200 may be spread among multiple devices/systems. The method 200 may be implemented in the form of executable instructions stored on a machine-readable storage medium, and/or in the form of electronic circuitry.

In one example, the method 200 can be executed by at least one processor of a computing device (e.g., processor 102 of device 100). In other examples, the method may be executed by another processor in communication with the system 10 (e.g., processor of a device 22). Various elements or blocks described herein with respect to the method 200 are capable of being executed simultaneously, in parallel, or in an order that differs from the illustrated serial manner of execution. The method 200 is also capable of being executed using additional or fewer elements than are sham in the illustrated examples.

The method 200 begins at 210, where at least one processor may detect at least one pointing action directed at a display in a multi-user environment. In some examples, the processor may detect multiple pointing actions from different users of the multi-user environment that are directed at a display 20 (e.g., users may be pointing at the same display or at different displays that share the same content). Alternatively, the processor may detect two different but simultaneous pointing actions by the same user (e.g., by using both hands).

When one of the devices 22 is a computer or device with a touch screen, detecting a pointing action from a user may be accomplished by sensing an action by the mouse or on the touchscreen (e.g., with different sensors). In other situations (e.g., where the multi-user environment includes a war room with a large display), the natural act of pointing may be captured via a depth-camera (e.g., positioned on at least one of the displays). Such systems typically have the ability to track the skeleton model/pose of multiple participants in 3D space, and make this skeleton pose available to other applications via an application program interface ("API"). The skeleton/pose date may be also used to detect the location of the pointing action. In other examples, the pointing action may be detected via a head mounted display or a system, where a depth camera (e.g., a Leap sensor) attached to the HMD may be used to detect the pointing gesture (e.g., by creating a vector and mapping it to a virtual space). Other techniques for detecting a pointing action may be used as well.

At that stage, the processor may also capture information about the user performing each pointing action. For example, the processor may capture at least one of an identification (e.g., user's name taken from her device), an image, a video, and an audio of the user performing each pointing action. In one example, the processor may use the user's pose estimation (e.g., user's skeleton used for pointing action detection) to estimate the user's head position. Further, the processor may crop the captured video to create a "head shot" to attach to the marker. In addition, techniques related to user's pose estimation may also be used in the touchscreen case, especially if there's more than one person using the screen. For example, pointing events may be still detected via touch-events on the screen, but a depth-camera plus pose-estimation could be used to "connect" a particular touch event to the head location of the user doing the pointing, and direct the capture of the appropriate live video image. As explained below, that information may be used to supplement the displayed marker for each pointing action such as each marker accompanied by a name, image, live video, or audio indicating the person doing the pointing.

At 220, the processor may determine whether more than one pointing actions is being detected. If the processor determines that only one pointing action is detected, the techniques in blocks 230-260 described below may be performed for the single pointing action being detected (at 225). In other words, the processor may ultimately generate a single unique marker for the pointing action on all displays of the multi-user environment that are displaying the same content, where the marker corresponds to the location of the pointing action performed by that user.

If the processor concludes that more than one pointing actions is being detected, the processor may next determine a location of each detected pointing action on the display and a displayed content being pointed to (at 230). In other words. In some implementations, the processor may use information various sensors associated with the display 20 or devices 22 (e.g., depth sensors, touch sensors, image sensors, etc.) to identify the location of the pointing action.

For example, using an API and the information received from a depth sensor, the processor may recognize a pointing action in a war-room or a HMD-based multi-user environment when: 1) a first direction vector indicated by the user's upper arm is similar to that indicated by the lower arm; and 2) a second direction vector indicated by user's shoulder to wrist intersects the space occupied by the displays. In some examples, the actual intersection point between the second vector and the physical extents of the screen surface may indicate the screen location being pointed at. Performing these calculations to detect at least one pointing action directed at a display may require some initial calibration involving the physical disposition of the display(s) 20 in relation to the depth camera(s). Alternatively, other techniques for detecting a pointing action may be used.

Further, based on the identified location of h detected pointing action on the display and based on information about the content being shown on the display and its location, the processor may identify the displayed content being pointed to. For example, the displayed content being pointed to may be an application (e.g., a spreadsheet, etc.), an image, or any other type of content.

At 240, the processor may communicate the location of each pointing action to all displays in the multi-user environment that are displaying the same content. These displays may or may not be at different physical locations. In some examples, the users' pointing actions and the captured user's information (e.g., identification, image, video, audio etc.) may also be broadcasted to other displays in the multi-user environment by using various signaling protocols. In some examples, the processor may broadcast the pointing action and the location with respect to a particular displayed content. Other displays in the system may then choose to act on this information or not, depending on whether they are displaying that content or not.

Before communicating the location of each pointing action to all displays in the multi-user environment, the processor may map the location of each pointing action to an application being displayed on the display. In one implementation, the local arrangement of the display(s) (i.e., the displays the users are pointing at) may be mapped to a system reference layout that all locations can reference. For example, the layout of a war-room multi-user environment with several large displays may be used as the reference. Other locations of the multi-user environment that have fewer displays may have client software to map the location of each pointing action to an application being displayed on their available display resources (e.g., by scaling and/or switching between displays). This is especially true in the case of a PC/tablet user on a single screen. The goal of this mapping is to abstract the pointing location from the local display set up and to tie it the applications that are being displayed and pointed to. In other words, the processor may map from the physical location a user is pointing at and tie that to an actual location in a displayed application (e.g., spreadsheet, graph, etc.), so no matter where that application is displayed in some other display(s) the marker is still pointing to the same point in that application regardless where the application is positioned in that other display(s).

At 250, the processor may map the location of each pointing action to a local display layout at each of the displays in the multi-user environment that are displaying the same content. For example, when the displays in the multi-user system that are displaying the content being pointed at receive the pointing location, the processor may map the pointing location of the application to the displays at that location. Therefore, the pointing location of each pointing action by a different users is kept in the same position with respect to the content/application being displayed no matter at which display(s) is being displayed.

At 260, the processor may generate a unique marker for each pointing action on all displays of the multi-user environment that are displaying the same content. In other words, depending on the number of detected pointing actions, the processor generates and displays a marker associated with each of the pointing actions, where each unique marker corresponds to the location of each pointing action performed by a different user. For example, when four different users in the multi-user environment point to four display points (e.g., of a graph), the processor may generate four unique markers corresponding to the pointing action of each user. The processor may display at least one of the identification (e.g., name, ID numbers, etc.), the image, the video, and the audio of the user performing each pointing action together with each marker being generated on the displays that are displaying the same content.

When the displayed/pointed to content is a stereoscopic 3D content the generated marker/cursor may be rendered to appear at a constant screen depth in front of all 3D content (e.g., with zero disparity). That way, this marker may appear to overlay the same content for all viewers regardless of their location and view of the 3D image. In other words, when stereoscopic 3D content is displayed, the system doesn't know what the stereoscopic 3D depth of the object being pointed to is, it just knows what point on the screen is being pointed at. If the generated stereoscopic 3D content appears to be behind the screen, then the system may render a pointer at that screen location in 3D with zero disparity, so that the pointer appears to be "on" the surface, and it will appear to overlay the 3D content in the correct position. If the content appears to extend in front of the screen surface, the system may be configured to render a pointer with a fixed negative disparity, so as to keep the pointer in front of any rendered content.

In one example, the processor may automatically adjust displays in the multi-user environment not displaying the content being pointed to by the at least one pointing action to display the content and the marker for the pointing action. In other words, when some of the displays in the multi-user environment (having the same or different location as the display being pointed at) do not display the content that users are pointing to, the processor may adjust these displays to display that content which is being pointed to. That way, all displays in the multi-user environment may display the same content and same pointers, helping all participants to be more involved and productive.

Further, the processor may continue to display the unique markers on the different displays while it continues to detect the corresponding pointing action performed by the user. In one example, the processor may move each of the markers to an area of the displays that is different from the location of each detected pointing action when the corresponding pointing action on the display is no longer detected. For instance, all markers of users that previously pointed at the display but are currently not pointing may be moved to one of the corners of the display to create a better visibility. These markers may be used again if these users resume their pointing and a new pointing action is detected.

Figure 3:
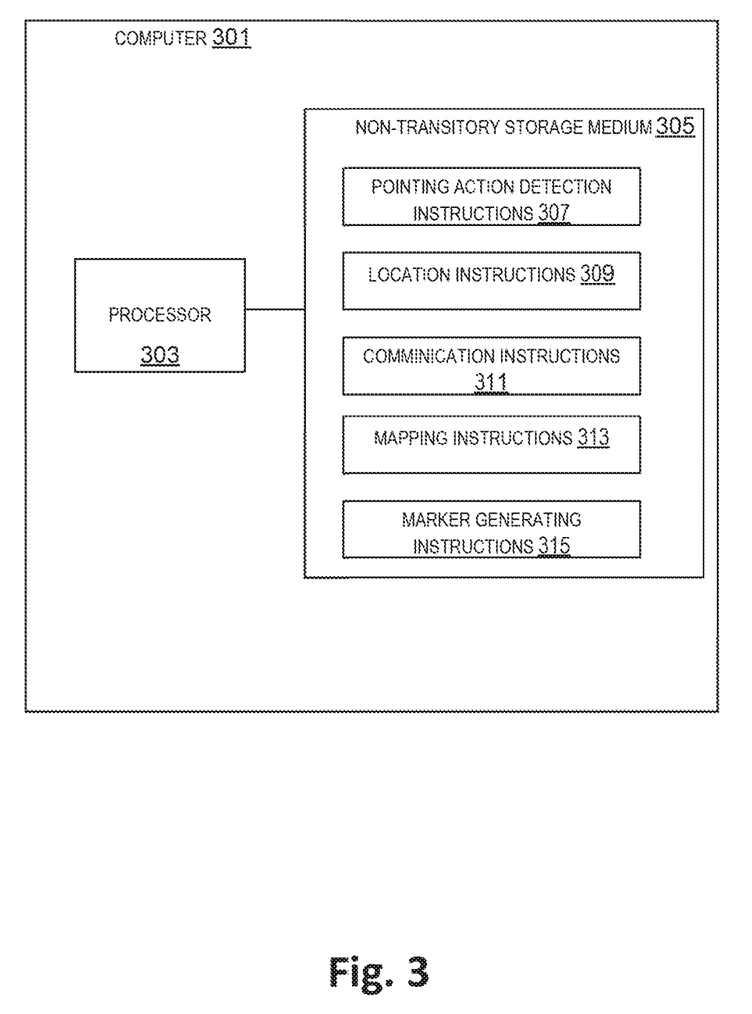
FIG. 3 is an example block diagram illustrating a computer-readable medium in accordance with an implementation of the present disclosure.

FIG. 3 illustrates a computer 301 and a non-transitory machine-readable medium 305 according to an example. In one example, the computer 301 maybe similar to the computing device 100 of the system 10 or may include a plurality of computers. For example, the computer may be a server computer, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, gesture input device, etc.).

Computer 301 may perform method 200 and variations thereof. Additionally, the functionality implemented by computer 301 may be part of a larger software platform, system, application, or the like. Computer 301 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 301 may include a processor 303 and non-transitory machine-readable storage medium 305. The processor 303 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 305 may be operatively coupled to a bus. Processor 303 can include single or multiple cores on a chip, multiple cores across multiple chips, multiple cores across multiple devices, or combinations thereof.

The storage medium 305 may include any suitable type, number, and configuration of volatile or non-volatile machine-readable storage media to store instructions and data. Examples of machine-readable storage media in include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored.

Software stored on the non-transitory machine-readable storage media 305 and executed by the processor 303 includes, for example, firmware, applications, program data, filters, rules, program modules, and other executable instructions. The processor 303 retrieves from the machine-readable storage media 505 and executes, among other things, instructions related to the control processes and methods described herein.

The processor 303 may fetch, decode, and execute instructions 307-315 among others, to implement various processing. As an alternative or in addition to retrieving and executing instructions, processor 303 may include at least one integrated circuit (IC), other control logic, other electronic circuits, or combinations thereof that include a number of electronic components for performing the functionality of instructions 307-315. Accordingly, processor 303 may be implemented across multiple processing units and instructions 307-315 may be implemented by different processing units in different areas of computer 301.

The instructions 307-315 when executed by processor 303 (e.g., via one processing element or multiple processing elements of the processor) can cause processor 303 to perform processes, for example, method 200, and/or variations and portions thereof. In other examples, the execution of these and other methods may be distributed between the processor 303 and other processors in communication with the processor 303.

For example, pointing action detection instructions 307 may cause processor 303 detect a plurality of pointing actions directed at a display in a multi-user environment, where the pointing actions are performed by different users. Further, instructions 307 may cause processor 307 to capture at least one of an identification, an image, a video, and an audio of each of the users performing each of the pointing actions. These instructions may function similarly to the techniques described in block 210 of method 200.

Location instructions 309 may cause the processor 303 to determine locations of each of the pointing actions on the display and a displayed content being pointed to. In some examples, instructions 309 may cause the processor use data from various sensors associated with the display 20 or devices 22 to detect the motion of a user. Further, the location engine 130 may use information about the position of the user, the position of the displays, and may perform various calculations to determine the location of each detected pointing action on the display and the displayed content being pointed to. These instructions may function similarly to the techniques described in block 230 of method 200.

Communication instructions 311 may cause the processor 303 to communicate the location of each of the pointing actions to all displays in the multi-user environment that are displaying the same content. In addition, instructions 311 may cause the processor 303 to communicate at least one of the identification, the image, the video, and the audio of each of the users performing each of the pointing actions to other displays in the multi-user environment that are displaying the same content. These instructions may function similarly to the techniques described in block 240 of method 200.

Mapping instructions 313 may cause the processor 303 to map the locations of each of the pointing actions to a local display layout at each of the displays in the multi-user environment that are displaying the same content. Also, mapping instruction 313 may cause the processor to map the locations of each of the pointing actions to an application being displayed on the display prior to communicating the location of each of the pointing actions to all displays in the multi-user environment. These instructions may function similarly to the techniques described block 250 of method 200 and in me first mapping engine 140.

Marker generating instructions 315 may cause the processor 303 to generate a plurality of markers on all displays of the multi-user environment that are displaying the same content, where each of the plurality of markers corresponds to a location of a different pointing action by a different user. Further, 315 may cause the processor 303 to display at least one of the identification, the image, the video, and the audio of each of the users performing each of the pointing actions together with the marker for that user being generated on the displays that are displaying the same content. These instructions may function similarly to the techniques described block 260 of method 200.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by at least one processor:
    detecting a pointing action made by a first user directed at a first display in a multi-user environment;
    determining a location of the detected pointing action on the first display and a displayed first content being pointed to;
    capturing a name of the first user;
    communicating the location of the pointing action to multiple displays in the multi-user environment that are displaying the first content;
    mapping the location of the pointing action to a local display layout at each of the multiple displays in the multi-user environment that are displaying the first content; and
    generating a unique marker supplemented with the captured name of the first user for the pointing action on the multiple displays of the multi-user environment that are displaying the first content, the generated unique marker supplemented with the captured name of the first user displayed by the multiple displays at respective locations of the multiple displays based on the mapping.

2. The method of claim 1, further comprising, by the at least one processor:
    mapping the location of the pointing action to an application having content displayed on the first display.

3. The method of claim 1, further comprising, by the at least one processor:
    communicating the captured name of the first user to other displays of the multiple displays in the multi-user environment that are displaying the first content, the other displays comprising displays of the multiple displays other than the first display.

4. The method of claim 1, further comprising, by the at least one processor:
    moving the unique marker to an area of each respective display of the multiple displays, the area different from the respective location of the pointing action on the respective display when the pointing action on the first display is no longer detected.

5. The method of claim 1, further comprising, by the at least one processor:
    automatically adjusting a further display in the multi-user environment not displaying the first content being pointed to by the pointing action to display the first content and the marker supplemented with the captured name of the first user.

6. The method of claim 1, further comprising, by the at least one processor:
    detecting a further pointing action made by a second user directed at a second display of the multiple displays;
    determining a further location of the detected further pointing action on the second display:
    capturing a name of the second user;
    communicating the further location of the detected further pointing action to the multiple displays;
    mapping the further location of the further pointing action to the local display layout at each of the multiple displays;
    generating a further unique marker supplemented with the captured name of the second user for the further pointing action on the multiple displays, the generated further unique marker supplemented with the captured name of the second user displayed by the multiple displays at respective locations of the multiple displays based on the mapping of the further location of the further pointing action.

7. The method of claim 1, wherein the multi-user environment comprises a plurality of displays, the method further comprising, by the at least one processor:
    determining that the multiple displays of the plurality of displays are displaying the first content, and that a further display of the plurality of displays is not displaying the first content,
    wherein the location of the pointing action is communicated to the multiple displays based on the determining that the multiple displays of the plurality of displays are displaying the first content.

8. A system comprising:
    a processor; and
    a non-transitory storage medium storing instructions executable on the processor to:
        detect a pointing action directed at a first display in a multi-user environment;
        determine a location of the detected pointing action on the first display and a displayed first content being pointed to;
        map the location of the pointing action to an application being displayed on the first display;
        determine a name of a first user;
        communicate the location of the pointing action to multiple displays in the multi-user environment that are displaying the first content;
        map the location of the pointing action to a local display layout at each of the multiple displays in the multi-user environment that are displaying the first content; and
        generate a pointer supplemented with the determined name of the first user for the pointing action on the multiple displays of the multi-user environment that are displaying the first content, the generated pointer supplemented with the determined name of the first user displayed by the multiple displays at respective locations of the multiple displays based on the mapping.

9. The system of claim 8, wherein the instructions are executable on the processor further to:
    move the pointer to an area of each respective display of the multiple displays that is different from the respective location of the pointing action on the respective display when the pointing action on the first display is no longer detected.

10. The system of claim 8, wherein the instructions are executable on the processor further to:
    automatically adjust a further display in the multi-user environment not displaying the first content being pointed to by the pointing action to display the first content and the pointer supplemented with the determined name of the first user for the pointing action.

11. The system of claim 8, wherein the multi-user environment comprises a plurality of displays, and wherein the instructions are executable on the processor to:
   determine that the multiple displays of the plurality of displays are displaying the first content, and that a further display of the plurality of displays is not displaying the first content,
   wherein the location of the pointing action is communicated to the multiple displays based on the determining that the multiple displays of the plurality of displays are displaying the first content.

12. A non-transitory machine-readable storage medium encoded with instructions executable by at least one processor, the machine-readable storage medium comprising instructions to:
   detect a plurality of pointing actions directed at a first display in a multi-user environment, wherein the plurality of pointing actions are performed by different users;
   determine locations of the plurality of pointing actions on the first display and a displayed first content being pointed to;
   determine names of the different users;
   communicate the location of each of the plurality of pointing actions to multiple displays in the multi-user environment that are displaying the first content;
   map the locations of the plurality of pointing actions to respective local display layouts of the multiple displays in the multi-user environment that are displaying the first content; and
   generate a plurality of markers supplemented with the corresponding determined names of the different users on the multiple displays of the multi-user environment that are displaying the first content, the generated plurality of markers supplemented with the corresponding determined names of the different users displayed by the multiple displays at respective locations of the multiple displays based on the mapping.

13. The non-transitory machine-readable storage medium of claim 12, wherein the instructions are to:
   map the locations of the plurality of pointing actions to an application being displayed on the first display.

14. The non-transitory machine-readable storage medium of claim 12, wherein the instructions are to:
   communicate the determined names of the different users to other displays of the multiple displays in the multi-user environment that are displaying the first content, the other displays comprising displays of the multiple displays other than the first display.

15. The non-transitory machine-readable storage medium of claim 12, wherein the instructions are to:
   automatically adjust a further display in the multi-user environment not displaying the first content being pointed to by the plurality of pointing actions to display the first content and the plurality of markers supplemented with the corresponding determined names of the different user.

16. The non-transitory machine-readable storage medium of claim 12, wherein the instructions are to:
   move the plurality of markers to an area of each respective display of the multiple displays that is different from the locations of the plurality of pointing actions when the plurality of pointing actions on the first display are no longer detected.

17. The non-transitory machine-readable storage medium of claim 12, wherein the multi-user environment comprises a plurality of displays, and wherein the instructions are to:
   determine that the multiple displays of the plurality of displays are displaying the first content, and that a further display of the plurality of displays is not displaying the first content,
   wherein the locations of the plurality of pointing actions are communicated to the multiple displays based on the determining that the multiple displays of the plurality of displays are displaying the first content.

* * * * *